US012781857B2

(12) United States Patent
Ospina et al.

(10) Patent No.: US 12,781,857 B2
(45) Date of Patent: Nov. 3, 2026

(54) SCRAPER SEAL

(71) Applicant: Freudenberg Flow Technologies LLC, Houston, TX (US)

(72) Inventors: Sebastian Ospina, Houston, TX (US); Brian A. Wallace, Kingwood, TX (US); Ian Smitham, Bridgend (GB); Patrick Rawls, Cypress, TX (US)

(73) Assignee: Freudenberg Flow Technologies LLC, Houston, TX (US)

( * ) Notice: Subject to any disclaimer, the term of this patent is extended or adjusted under 35 U.S.C. 154(b) by 0 days.

(21) Appl. No.: 19/315,962

(22) Filed: Sep. 2, 2025

(65) Prior Publication Data

US 2026/0078824 A1 Mar. 19, 2026

Related U.S. Application Data

(60) Provisional application No. 63/696,087, filed on Sep. 18, 2024.

(51) Int. Cl.
*F16J 15/3232* (2016.01)
*F16L 17/08* (2006.01)

(52) U.S. Cl.
CPC ........... *F16J 15/3232* (2013.01); *F16L 17/08* (2013.01)

(58) Field of Classification Search
CPC .......... F16J 15/02; F16J 15/021; F16J 15/022; F16J 15/025; F16J 15/3232; F16L 17/08
See application file for complete search history.

(56) References Cited

U.S. PATENT DOCUMENTS 3,479,063 A * 11/1969 Raver ..................... F16L 17/08 285/379
6,419,237 B1 * 7/2002 More ..................... F16J 15/121 277/637
6,540,234 B1 * 4/2003 Atkinson ............. F16J 15/0825 277/653
7,204,525 B2 4/2007 Matzner
8,186,691 B2 * 5/2012 Baxi ..................... F16L 23/167 277/609
8,764,021 B2 * 7/2014 More ..................... F16L 37/56 285/108
2005/0242519 A1 11/2005 Koleilat et al.
2007/0222159 A1 * 9/2007 Baxi ..................... F16J 15/127 277/365
2010/0320699 A1 * 12/2010 Takeda .................... F16L 23/22 277/612
2011/0140374 A1 6/2011 Dubiel
2015/0176744 A1 6/2015 Glassman et al.
2021/0148468 A1 5/2021 Jillella et al.

* cited by examiner

*Primary Examiner* — Gilbert Y Lee
(74) *Attorney, Agent, or Firm* — Harness, Dickey & Pierce, P.L.C.

(57) ABSTRACT

A seal assembly includes a pair of pipe couplings configured to be secured to a respective pair of pipes, each pipe coupling including an annular seal surface. An annular metal seal ring includes a pair of seal lips configured to engage a respective one of the annular seal surfaces of the pair of pipe couplings. A pair of scraper rings are secured to the pair of seal lips and include a scraper edge that extends radially beyond a distal end of the seal lips.

14 Claims, 2 Drawing Sheets

SCRAPER SEAL

CROSS-REFERENCE TO RELATED APPLICATIONS

This application claims the benefit of U.S. Provisional Application No. 63/696,087, filed on Sep. 18, 2024. The entire disclosure of the above application is incorporated herein by reference.

FIELD

The present disclosure relates to a scraper mechanism that is mounted to a seal.

BACKGROUND

This section provides background information related to the present disclosure which is not necessarily prior art.

Pipes that are connected end to end can be connected with metal-to-metal seals. An example is a seal ring having a pair of internal seal lips and a pair of external seal lips that sealing engage a raised rib of opposing pipe couplings.

During operations, operations sometimes take place using a remotely operated connector in order to safely keep personnel away from the red zones. Connector mating spools are provided on each end and all the sealing surfaces are not accessible by operators due to safety regulations. These mating spools and sealing surfaces are required to be clean and free of debris to ensure proper seal and uniform contact force. The mating spool's sealing surfaces are exposed and contaminated with highly corrosive and abrasive materials. Debris, grease, sand, salt, metal shavings, etc. coming up from the well (sometime referred to as produced fluid) can be retained on the seat profile. These abrasive materials present on the seats during close and open cycles are damaging the sealing profiles and drastically reducing the utilizable life of the seal.

SUMMARY

This section provides a general summary of the disclosure, and is not a comprehensive disclosure of its full scope or all of its features.

The present disclosure provides a seal with a scrapper mechanism used to remove debris from the seal seat pocket prior to reaching full mating position.

A seal assembly includes a pair of pipe couplings that are configured to be secured to a respective pair of pipes, each pipe coupling including a seal seat in the form of an annular bead with tapered inner and outer side walls. An annular metal seal ring includes a pair of inner seal lips configured to engage a respective one of the tapered inner side walls of the annular bead of the pair of pipe couplings and a pair of outer seal lips configured to engage a respective one of the tapered outer side walls of the annular bead of the pair of pipe couplings. A pair of inner scraper rings are secured to the pair of inner seal lips and including a first scraper edge that extends radially outward beyond a distal end of the inner seal lips. A pair of outer scraper rings are secured to the pair of outer seal lips and including a second scraper edge that extends radially inward beyond a distal end of the outer seal lips.

According to a further aspect, during assembly, the first scraper edge of the pair of inner scraper rings engage the respective one of the tapered inner side walls of the annular bead of the pair of pipe couplings and the second scraper edge of the pair of outer scraper rings engage the respective one of the tapered outer side walls of the annular bead of the pair of pipe couplings.

According to a further aspect, the pair of inner scraper rings and the pair of outer scraper rings are made from one of rubber, plastic and polyurethane.

According to a further aspect, the pair of inner scraper rings and the pair of outer scraper rings are snap-fit on to the annular metal seal ring.

According to a further aspect, the pair of outer scraper rings are glued to the pair of outer seal rings.

According to a further aspect, the pair of outer scraper rings include a plurality of annular grooves formed on an inner surface of the pair of outer scraper rings.

According to a further aspect, the pair of inner seal lips include a tapered outer surface.

According to a further aspect, the pair of outer seal lips include a tapered inner surface.

According to another aspect, a seal assembly includes a pair of pipe couplings configured to be secured to a respective pair of pipes, each pipe coupling including an annular seal surface. An annular metal seal ring includes a pair of seal lips configured to engage a respective one of the annular seal surfaces of the pair of pipe couplings. A pair of scraper rings are secured to the pair of seal lips and include a scraper edge that extends radially beyond a distal end of the seal lips.

According to a further aspect, during assembly, the scraper edge of the pair of inner scraper rings engage the respective one of the annular seal surface of the pair of pipe couplings.

According to a further aspect, the pair of seal lips include a tapered surface.

According to a further aspect, the pair of scraper rings are made from one of rubber, plastic and polyurethane.

According to a further aspect, the pair of scraper rings are snap-fit on to the annular metal body.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
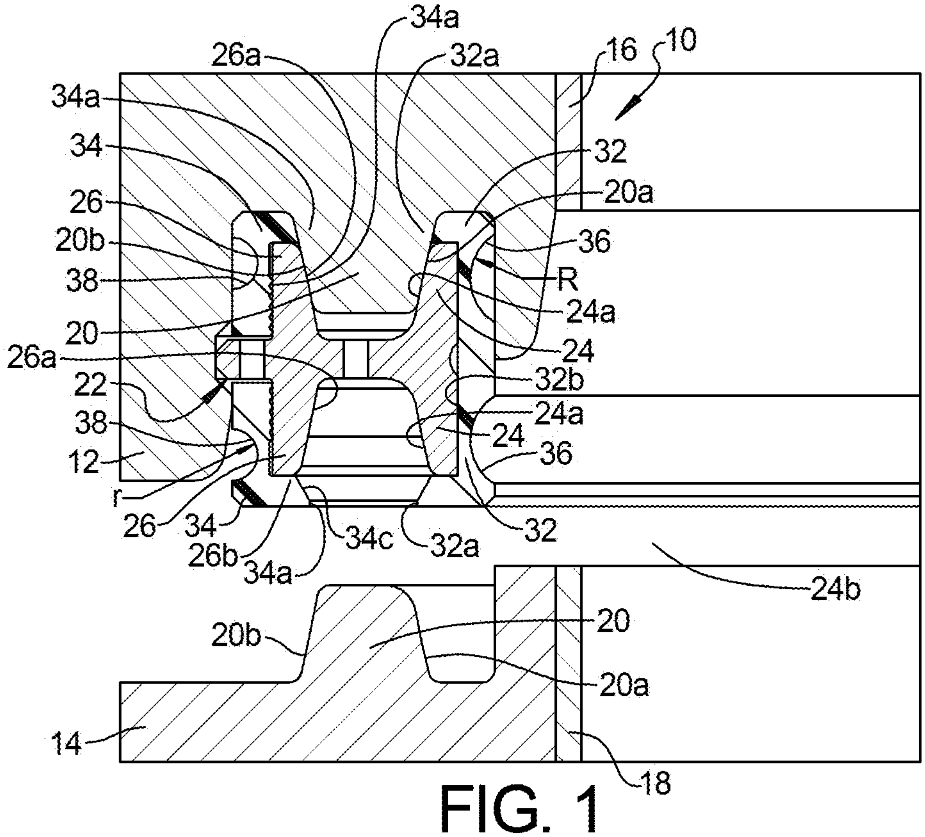
FIG. 1 is a cross-sectional view of an annular coupling between two pipes and having a scraper seal in a disassembled state.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
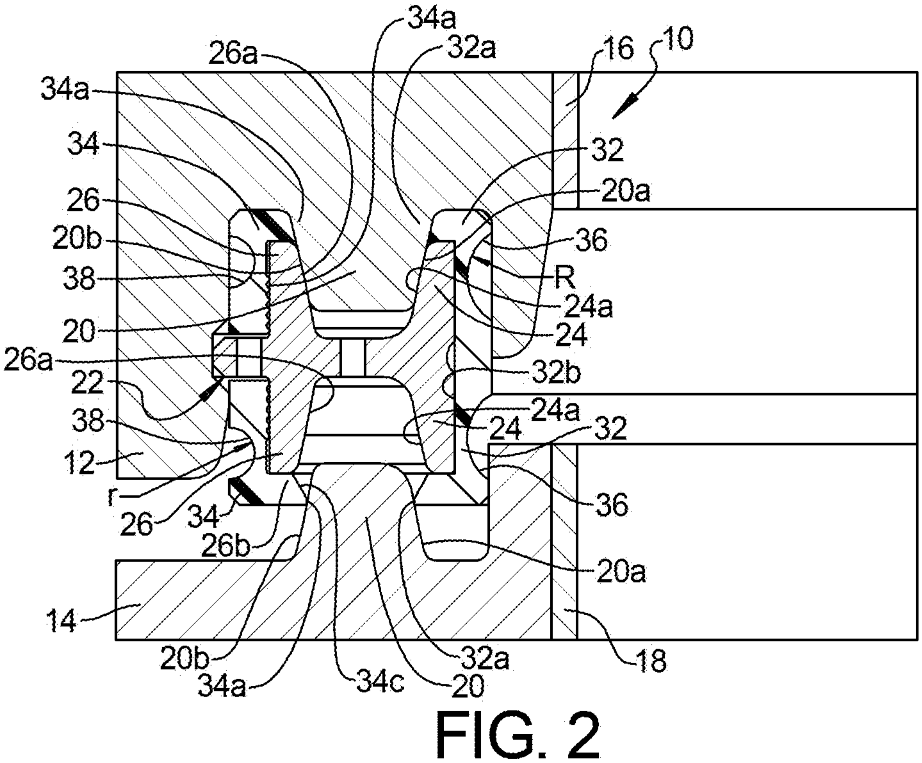
FIG. 2 is a cross-sectional view of an annular coupling between two pipes and having a scraper seal in a beginning of engagement with the seal surface.

With reference to FIGS. 1 and 2 a seal assembly 10 includes a pair of pipe couplings 12, 14 that are configured to be secured to a respective pair of pipes 16, 18. Each pipe coupling 12, 14 includes an annular bead 20 that extends in an axial direction. The annular beads 20 each include a tapered inner side wall 20*a* and a tapered outer side wall 20*b*.

An annular metal seal ring 22 can include a pair of inner seal lips 24 configured to engage a respective one of the tapered inner side walls 20*a* of the annular bead 20 of the pair of pipe couplings 12, 14. The annular metal seal ring 22 can further include a pair of outer seal lips 26 configured to engage a respective one of the tapered outer side walls 20*b* of the annular bead 20 of the pair of pipe couplings 12, 14.

The pair of inner seal lips 24 each include a tapered outer sealing surface 24*a* that engages the tapered inner side wall 20*a* of the annular bead 20 in an assembled condition. The pair of outer seal lips 26 each include a tapered inner sealing surface 26*a* that engages the tapered outer side wall 20*b* of the annular bead 20 in an assembled condition.

A pair of inner scraper rings 32 are secured to the pair of inner seal lips 24 by a snap-fit and each include a scraper edge 32*a* (the upper scraper edge 32*a* as shown in FIGS. 1 and 2 is deformed in the assembled state) that extends radially outward beyond a distal end of the inner seal lips 24. A pair of outer scraper rings 34 are secured to the pair of outer seal lips 26 by a snap-fit and each include a scraper edge 34*a* (the upper scraper edge 34*a* as shown in FIGS. 1 and 2 is deformed in the assembled state) that extends radially inward beyond a distal end of the outer seal lips 26. The scraper edges 32*a*, 34*a* are sized and designed to engage and scrape any debris from an entire contact surface of the tapered inner side wall 20*a* and the tapered outer side wall 20*b* of the annular bead 20.

The pair of inner scraper rings 32 can be formed integrally with each other and can optionally be snap-fit onto the inner seal lips 24 of the annular metal seal ring 22. The pair of outer scraper rings 34 can be formed separately or integrally with each other and can include a plurality of adhesive grooves 34*a* to provide a grip profile to be glued in place on the metal seal ring 22. An outer surface of the outer seal lips 24 can further include adhesive grooves (not shown) to enhance the adhesive bond. The pair of inner scraper rings 32 and the pair of outer scraper rings 34 can be made from plastic or other elastomeric and polymeric compounds depending upon the application. The pair of inner scraper rings 32 each include an annular recess 36, a depth of which can control a scrapper stiffness. The pair of annular recesses 36 can be radiused with a radius R. The pair of outer scraper rings 34 each include an annular recess 38, a depth of which can control a scrapper stiffness. The pair of annular recesses 38 can be radiused with a radius r.

Figure 3:
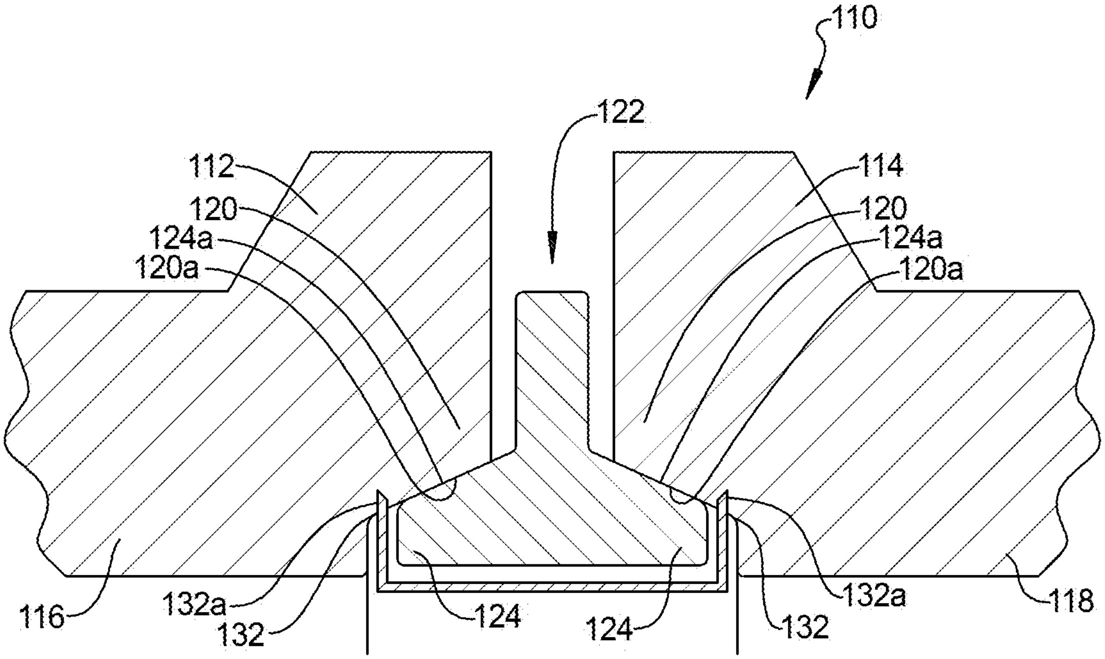
FIG. 3 is a cross-sectional view of an annular coupling between two pipes and having a seal with a pair of scraper rings engaging the annular couplings.

FIG. 3 shows a schematic view of the pair of inner scraper rings 132 formed as a single piece.

During assembly of the annular metal seal ring 22 to the pipe couplings 12, 14, the first scraper edge 32*a* of the pair of inner scraper rings 32 engage the respective one of the tapered inner side walls 20*a* of the annular bead 20 of the pair of pipe couplings 12, 14 to scrape any debris off of the tapered inner side wall 20*a* of the annual raised bead 20. In addition, the second scraper edge 34*a* of the pair of outer scraper rings 34 engage the respective one of the tapered outer side walls 20*b* of the annular bead 20 of the pair of pipe couplings 12, 14 to scrape any debris off of the tapered outer side wall 20*b* of the annular raised bead 20.

The present disclosure provides a seal adaptable scraper that can latch-on/clip-on/snap-on the metal seals with the purpose of, remotely and without human interaction, removing debris from the seal seat pocket prior to reaching a full mating position. The seal scrapers 32, 34 can be made from a variety of elastomeric and polymeric material options including Rubber (HNBR/NBR/XNBR/other TBD; currently 90-durometer), Polyurethane (currently 90-durometer but can include other durometers), and Thermoplastic (including PEEK/PTFE/UHMWPE/other TBD).

With reference to FIG. 3, a seal assembly 110 includes a pair of pipe couplings 112, 114 that are configured to be secured to a respective pair of pipes 116, 118. Each pipe coupling 112, 114 includes an annular bead 120 that extends in an axial direction. The annular beads 120 each include a tapered inner side wall 120*a*.

An annular metal seal ring 122 can include a pair of seal lips 124 configured to engage the tapered inner side walls 120*a* of the annular bead 120 of the pair of pipe couplings 112, 114.

The pair of seal lips 124 each include a tapered outer sealing surface 124*a* that engages the tapered inner side wall 120*a* of the annular bead 120 in an assembled condition.

A pair of inner scraper rings 132 are secured to the pair of seal lips 124 by a snap-fit and each include a scraper edge 132*a* that extends radially outward beyond a distal end of the seal lips 124. The scraper edges 132*a* are sized and designed to engage and scrape any debris from an entire contact surface of the tapered side wall 120*a* of the annular bead 120.

The pair of scraper rings 132 can be secured together as a single piece that is snap-fit to the annular metal seal ring 122. The pair of scraper rings 132 can be made from plastic or other elastomeric and polymeric compounds depending upon the application.

The seal adaptable scraper is designed with sufficient thickness to ensure secure stretch and compression fit. The seal adaptable scraper has been developed with optimal geometry to allow just enough elastic deformation to maintain uniform contact force against the seal seat to perform the scraping action as the connection is being close. The seal adaptable scraper's geometry does not obstruct the seal's fit, form, and function during closure. The seal adaptable scraper geometry returns to its original form once the connection is open. The seal adaptable scraper lip is designed to be flexible enough to follow the contour of the seal's seat while maintaining the integrity of the sealing surface and seat as it is being stiff enough to perform scraping action.

Use of a seal's adaptable scraper mechanism with the function of, remotely without human interaction, removing debris from sealing surface prior to seal seating.

Use of a seal's adaptable scraper mechanism to enhance seals life and seal sealing while exposed to abrasive materials. Without compromising duo seal capabilities and performance.

A seal adaptable scraper is a component added to metal seals with the purpose of, remotely and without human interaction, removing debris from the seal seat pocket prior to reaching full mating position The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seal assembly comprising:

a pair of annular metal pipe couplings configured to be secured to a respective pair of pipes, each annular metal pipe coupling including a coaxial center passage extending therethrough, the pair of annular metal pipe couplings including an annular bead with a tapered inner side wall and a tapered outer side wall;

an annular metal seal ring including a pair of axially spaced inner seal lips configured to engage a respective one of the tapered inner side walls of the annular bead of the pair of annular metal pipe couplings and a pair of axially spaced outer seal lips spaced radially outward of the pair of axially spaced inner seal lips configured to engage a respective one of the tapered outer side walls of the annular bead of the pair of annular metal pipe couplings, wherein the pair of inner seal lips include a tapered outer surface and the pair of outer seal lips include a tapered inner surface;

a pair of inner scraper rings secured to the pair of axially spaced inner seal lips and each of the pair of inner scraper rings including a first scraper edge that extends radially outward beyond a distal end of the inner seal lips and configured to scrape debris from the tapered inner side wall of the respective annular bead when the annular metal seal ring is installed between the pair of annular metal pipe couplings; and a pair of outer scraper rings secured to the pair of axially spaced outer seal lips and each of the pair of outer scraper rings including a second scraper edge that extends radially inward beyond a distal end of the outer seal lips and configured to scrape debris from the tapered outer side wall of the respective annular bead when the annular metal seal ring is installed between the pair of annular metal pipe couplings.

2. The seal assembly according to claim 1, wherein the pair of inner scraper rings and the pair of outer scraper rings are made from one of rubber, plastic and polyurethane.

3. The seal assembly according to claim 1, wherein at least one of the pair of inner scraper rings and the pair of outer scraper rings are snap-fit on to the annular metal seal ring.

4. The seal assembly according to claim 1, wherein the pair of outer scraper rings are glued to the pair of outer seal rings.

5. The seal assembly according to claim 4, wherein the pair of outer scraper rings include a plurality of annular grooves formed on an inner surface of the pair of outer scraper rings.

6. The seal assembly according to claim 1, wherein the pair of inner scraper rings are formed as a single piece.

7. The seal assembly according to claim 1, wherein the pair of outer scraper rings are formed as a single piece.

8. The seal assembly according to claim 1, wherein the pair of inner scraper rings each include an annular recess on an inner surface thereof.

9. The seal assembly according to claim 8, wherein the annular recess is radiused.

10. The seal assembly according to claim 1, wherein the pair of outer scraper rings each include an annular recess on an outer surface thereof.

11. The seal assembly according to claim 10, wherein the annular recess is radiused.

12. A seal assembly comprising:

a pair of annular metal pipe couplings configured to be secured to a respective pair of pipes, each annular metal pipe coupling including a coaxial center passage extending therethrough, the pair of annular metal pipe couplings including an annular bead with a tapered sidewall defining an annular seal surface;

an annular metal seal ring including a pair of tapered seal lips configured to engage a respective one of the annular seal surfaces of the pair of annular metal pipe couplings;

a pair of scraper rings secured to the pair of tapered seal lips and including a scraper edge that extends radially beyond a distal end of the pair of tapered seal lips and configured to scrape debris from the tapered sidewall of the annular seal surface when the annular metal seal ring is installed between the pair of annular metal pipe couplings.

13. The seal assembly according to claim 12, wherein the pair of scraper rings are snap-fit on to the annular metal seal ring.

14. The seal assembly according to claim 12, wherein the pair of scraper rings are formed as a single piece.

* * * * *